Dec. 27, 1927.　　　　　　　　　　　　　　　　1,654,276
G. E. TURNER
SELF LUBRICATING SHEAVE
Filed Jan. 25, 1927

Inventor
George E. Turner
By　Attorney
Albert F. Nathan

Patented Dec. 27, 1927.

1,654,276

UNITED STATES PATENT OFFICE.

GEORGE E. TURNER, OF NEW LEXINGTON, OHIO.

SELF-LUBRICATING SHEAVE.

Application filed January 25, 1927. Serial No. 163,319.

This invention relates to an improvement in sheaves and particularly to a type of sheaves known as boom point sheaves that are employed in large shovel machines, such as coal mining, dredging and similar machines. In these types of machines the sheaves have been so arranged as to be subjected to excessive wear and this improvement is intended to overcome such difficulties that have heretofore existed with sheaves intended for the foregoing purpose.

It has been usual to employ a pair of sheaves so arranged that the cable or hoist line passes around one sheave, then to a dipper or snatch-block sheave and from that sheave to the other companion sheave causing an undue strain to be brought upon one of the sheaves during the manipulation of the shovel due to the tendency of the cable or hoist to tilt said sheave in its relation to its companion sheave, which causes excessive wear at one or more points, thereby materially shortening the life of the sheaves and the cable. This invention is of such character that the two companion sheaves are formed and mounted in a way that will avoid this tendency of tilting and very much improve the life of the sheaves and furthermore provides for an improved method of lubricating the bearings.

Figure 2:
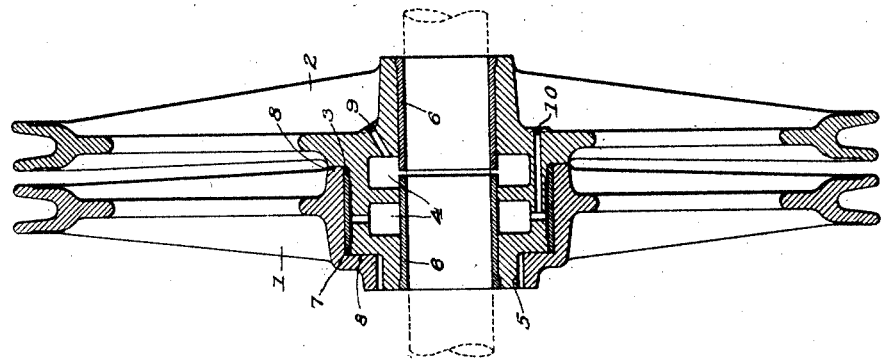
Figure 1:
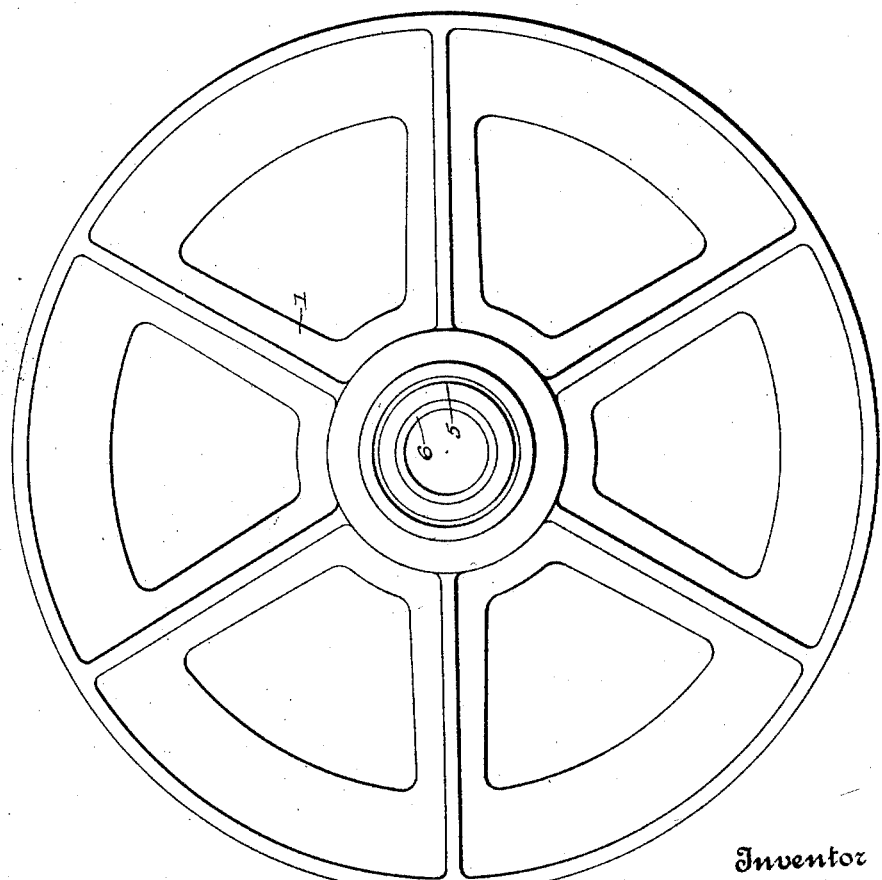

Referring to the drawings, Figure 1 is a side elevation of a pair of sheaves and Fig. 2 is a transverse sectional view through the center of the same.

Referring to the drawings, the sheave known as the female sheave is marked 1 and the male member is marked 2. The male member is preferably formed with an enlarged hub portion marked 3, and the space between the outer and inner rim of said enlarged hub is utilized to contain annular spaces 4 for the lubricant. At the outer end of this hub there is a reduced portion marked 5, and this male member has a bushing 6 which may be formed in two parts as shown in Fig. 2 or if preferred may be formed as one integral part. The shaft upon which the sleeves are mounted is shown in dotted lines.

The female member is formed with a bushing 7 and there is shown an oil groove below the annular lubricant spaces.

It will be apparent that the side contacting surfaces 8 formed at outer and inner ends of said female member and those of the hub of the male member also marked 8 insure that the female member will be held against any tilting movement. This tendency to tilt is caused by the hoist or cable first passing around the periphery of the female member to the snatch-block sheave (not shown) and from that snatch block sheave around the periphery of the male companion sheave and consequently when that snatch-block sheave is raised the tendency is to force the rim of the female sheave towards the rim of the male sheave, and unless means are provided for overcoming this tendency, there will develop excessive wear near the inner end of the hub of the male member. By reason of this enlarging of the hub of the male member having materially increased the amount of bearing surface and by virtue of the two end contacting surfaces marked 8, there is eliminated the excessive wear caused by the female member tilting on the male member.

A bushing may be used on the reduced portion 5 of the hub but it is not essential and the device is therefore preferably shown without such a bushing having no contacting surface at that point. It is also true that in this device the load is more evenly balanced about the central line of the female sheave than has heretofore been accomplished. That is due to the fact that the central line of that sheave passes almost through the center line of the enlarged hub bearing surface of the male sheave, as determined by an examination of Fig. 2.

It will be apparent that not only has the life of these sheaves been increased, but the life of the cable or hoist will also be increased; for if the female sheave is permitted to tilt, the rims of the two sheaves will ultimately contact causing the rims to become almost as sharp as a knife edge which necessarily will result in shortening the life of the cable or hoist which passes around the periphery of these sheaves. Passages 9 and 10 are for the introduction of the lubricant.

Having thus revealed this invention, I claim as new and desire to secure the following combinations and elements, or equivalents thereof, by Letters Patent of the United States,—

1. A structure of the character specified comprising a pair of sheaves, one sheave being mounted on the other, enlarged and reduced portions of said sheaves having a plurality of vertical bearing surfaces formed thereby.

2. A structure of the character specified comprising a pair of sheaves, a projecting hub portion formed on one of said sheaves and a socket formed on the other, there being formed between said parts a plurality of endwise contacting surfaces to maintain one sheave in its original vertical position on the hub of the other sheave.

3. In a pair of sheaves the combination of an enlarged hub with a reduced end, the central portion of one of said sheaves being formed and arranged to fit over said hub, whereby there will be formed a central bearing with endwise contacting surfaces at each side of said central portion, the center of said central portion being substantially co-incident with the center line passing through one of said sheaves.

4. In a pair of sheaves, the combination of one sheave formed with a hub, a second sheave formed with a socket, said hub having a bearing surface extending in the direction of its axis and vertical bearing surfaces, the said socketed sheave being mounted on said hub with complementary transversely disposed contacting surfaces, there being formed in said hub annular cavities for lubricants, and passages to said bearing surfaces.

5. In a pair of sheaves, the combination of one sheave formed with a hub, a second sheave formed with a socket, said hub being provided with transversely disposed bearing surfaces; said socketed sheave being provided with complementary contacting surfaces and mounted on said hub; there being formed in said hub a reservoir and passages to said bearing surfaces.

In witness whereof, I have hereunto subscribed my name.

GEORGE E. TURNER.